United States Patent [19]

Kuo, deceased et al.

[11] Patent Number: 5,104,072
[45] Date of Patent: Apr. 14, 1992

[54] INSERT TYPE OF DISENGAGEABLE UNDERGROUND CONDUIT HOLDER

[76] Inventors: Chun-Hua Kuo, deceased, late of Taipei, Taiwan; by Chun C. Yin, legal representative, 45814 Bridgeport Place, Fremont, Calif. 94539

[21] Appl. No.: 633,768
[22] Filed: Dec. 26, 1990
[51] Int. Cl.⁵ .............................................. F16L 3/22
[52] U.S. Cl. .............................. 248/68.1; 248/221.4; 248/224.4
[58] Field of Search ...................... 248/68.1, 73, 74.1, 248/74.2, 74.4, 74.5, 221.3, 221.4, 224.4; 403/289, 405.1, 406.1; 24/605, 614, 616

[56] References Cited

U.S. PATENT DOCUMENTS

| 3,188,030 | 6/1965 | Fischer | 248/68.1 |
| 3,523,667 | 8/1970 | Guerrero | 248/68.1 |
| 3,856,246 | 12/1974 | Sinko | 248/68.1 |
| 4,601,447 | 7/1986 | McFarland | 248/68.1 |
| 4,618,114 | 10/1986 | McFarland | 248/68.1 |

FOREIGN PATENT DOCUMENTS 2165099 4/1986 United Kingdom ............... 248/68.1

Primary Examiner—David M. Purol
Assistant Examiner—Robert A. Olson
Attorney, Agent, or Firm—Lalos & Keegan

[57] ABSTRACT

An improved insert type of disengageable underground conduit holder wherein the improvement includes a male section having acute hook portion and recess portion and a female section having corresponding complemental recess portion and acute hook portion, whereby when engaged, the hook portions of male and female section can tightly engage with the recess portions of the same and female, and on at least one side of the female section are disposed openings, permitting the male section to easily separate from the female section therethrough without damage in case of design change or wrong working, and stoppers are disposed in the opening to prevent the male section from undesirably slipping out of the female section.

7 Claims, 7 Drawing Sheets

FIG. 8G
FIG. 8F
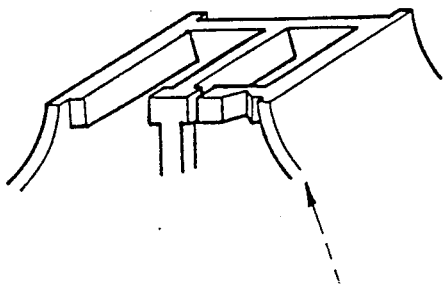
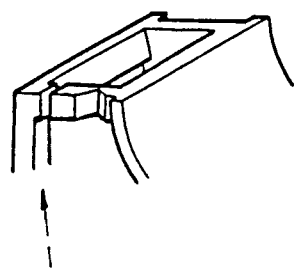
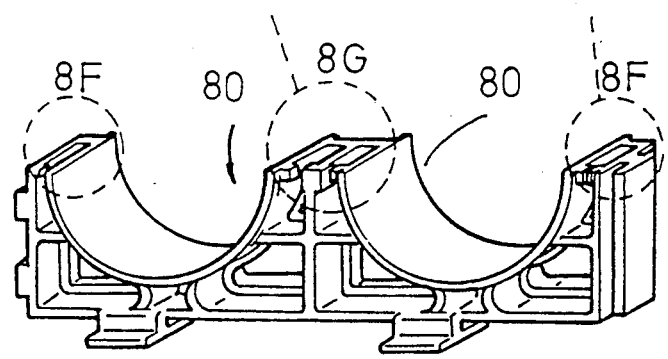
FIG. 8A 5,104,072

INSERT TYPE OF DISENGAGEABLE UNDERGROUND CONDUIT HOLDER

BACKGROUND OF THE INVENTION

The presently used insert type of plastic conduit holder, such as U.S. Pat. No 3,188,030 and Germany Patent No. 2,001,630, are applicable to many working situations. However, many shortcomings still exist in such conventional conduit holder when actually used. First, the male and female engaging structures of the unit of the conduit holder pertain to plane engaging structures, and therefore the engaging force thereof is weak and the male and female engaging structures are apt to separate from each other under larger pulling force. Second, once the unit is assembled, it can be hardly disengaged, and in case of working plan change or wrong assembly that requires disassembly of the unit, it often takes quite a lot of time and strength to break the engaging structures of male and female sections, and the disassembled engaging structures are always damaged and can not be reassembled or re-used. As a result, labor and material are all wasted.

It is therefore an object of the invention to develop the present insert type of disengageable underground conduit holder to eliminate the above shortcomings existing in prior art.

It is a primary object of this invention to provide an improved underground conduit holder wherein the prior plane engaging portions of male and female sections of the conduit holder are improved into an engaging structure having corresponding double acute hook portion and recess portions which are complementary to each other, whereby when associated, the hook portions of the male and female sections can tightly complementarily engage with the corresponding recess portions thereof respectively, so that the male and female sections can suffer more pulling force so as to achieve a better, more reliable engaging effect.

It is a further object of this invention to provide the above conduit holder wherein the male and female sections thereof can be freely disassembled without damage. On at least one side of the female section are disposed openings, permitting the male section to be easily separated from the female section through the openings without damaging the engaging structure. In addition, to prevent the male section from undesirable slipping out of the female section, stoppers are further disposed in the openings.

It is still a further object of this invention to provide the above conduit holder, wherein a male section with single engaging hook portion and a female section with corresponding single engaging recess portion are disposed so in case that the room for locating the conduit holder is insufficient, the male and female sections with single engaging hook portion can be applied at two ends of the conduit holder so as to efficiently utilize the space and keep proper engaging strength of the male and female sections.

The present invention can be best understood through the following description and accompanying drawings wherein:

BRIEF DESCRIPTION OF THE DRAWINGS

FIGS. 8A to 8G show the various applications of the present invention.

DESCRIPTION OF THE PREFERRED EMBODIMENT OF THE INVENTION

Figure 1A:
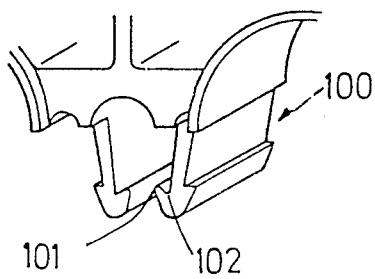
FIG. 1A is a perspective view of the double projections of male section of this invention showing the double acute hooks and recesses.
Figure 2A:
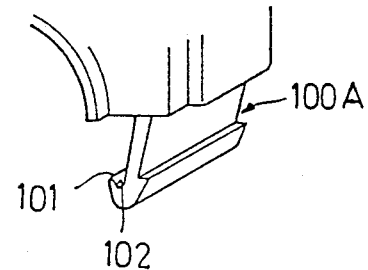
FIG. 2A is a perspective view of the single projection of male section of this invention showing a male section with a single acute hook and recess.

Please first refer to FIGS. 1 through 5, which illustrate the improvement in this invention. The present invention includes a double-side male section 100 and a double-side female section 400. The male section 100 is formed with a projection having an acute hook 101 and an associated recess 102, as shown in FIG. 1A. A single-side male section 100A is shown in FIG. 2A. The female section 400 is formed with double slant guide seat 401 having a hook 402 and a recess 403 correspondinng to the acute hook 101 and recess 102 of the male section 100, as shown in FIGS. 1B and 1C, whereby when the male and female sections 100, 400 are engaged with each other, the acute hooks 101, 402 thereof can complementally engage with the recesses 403, 102 to firmly form a underground conduit holder. A single-side female section 406 is also shown in FIGS. 2B and 2C.

Figure 1B:
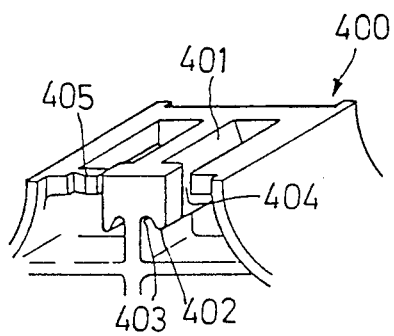
FIG. 1B is a perspective view of the double slant guide seat of the female section of this invention, corresponding to the male section of FIG. 1A.
Figure 2B:
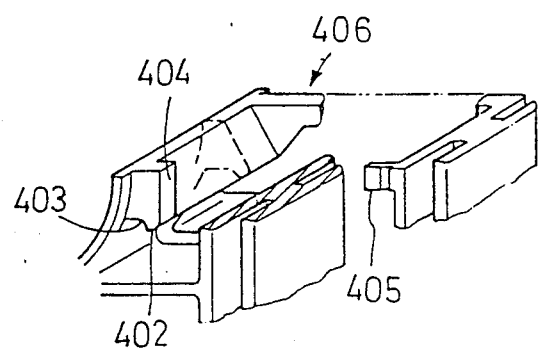
FIG. 2B is a perspective view of the single slant guide seat of the female section corresponding to the male section of FIG. 2A.
Figure 1C:
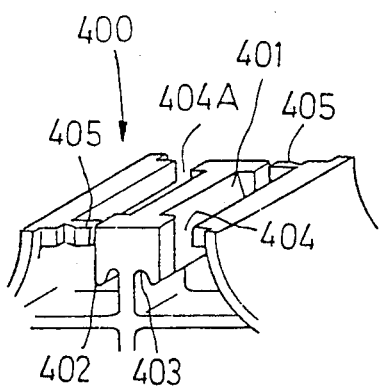
FIG. 1C is a perspective view of the female section according to FIG. 1B showing both sides of the female section formed with two openings and one of the openings on each side is further provided with a movable stopper member.
Figure 2C:
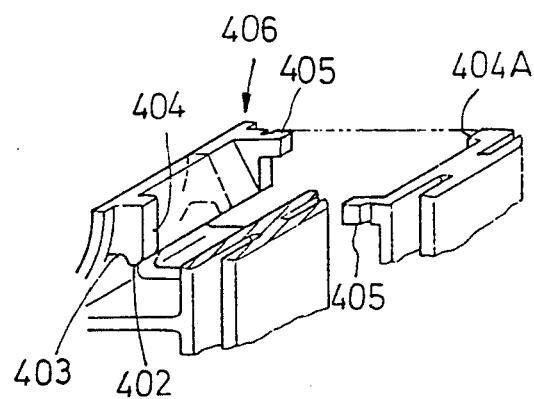
FIG. 2C is a perspective view of the female section according to FIG. 2B showing a movable stopper member disposed in an opening formed on both sides of a female section.
Figure 3A:
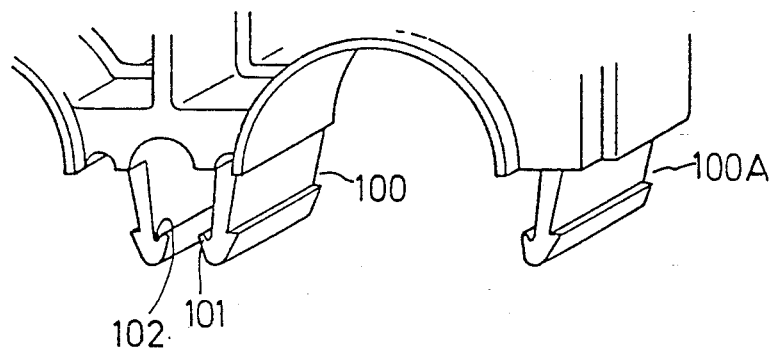
FIG. 3A is a perspective view of male assembly of an embodiment of this invention having both double and single projections of male sections of FIGS. 1A and 2A.
Figure 3B:
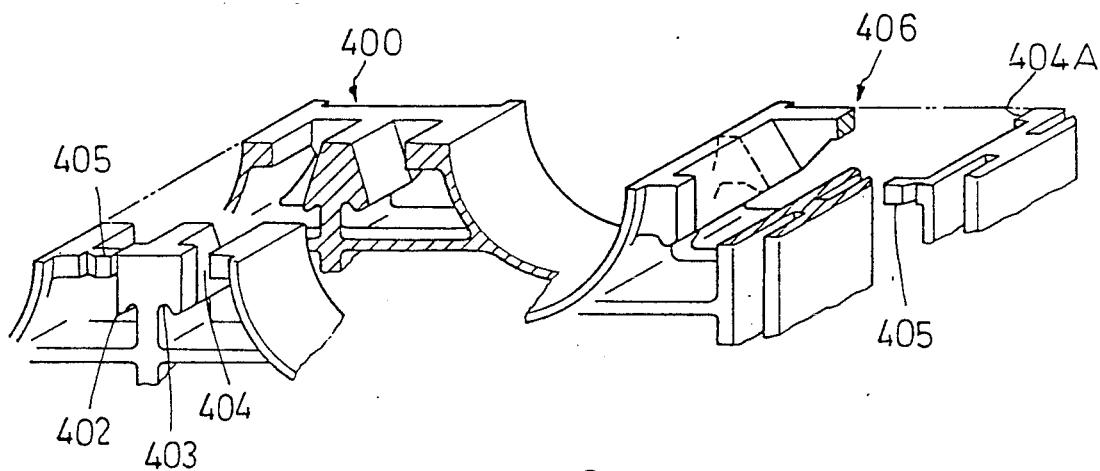
FIG. 3B shows a perspective view of female assembly of an embodiment of this invention having both double and single slant guide seat of female sections of FIGS. 1B and 2B corresponding to the male assembly of FIG. 3A.
Figure 3C:
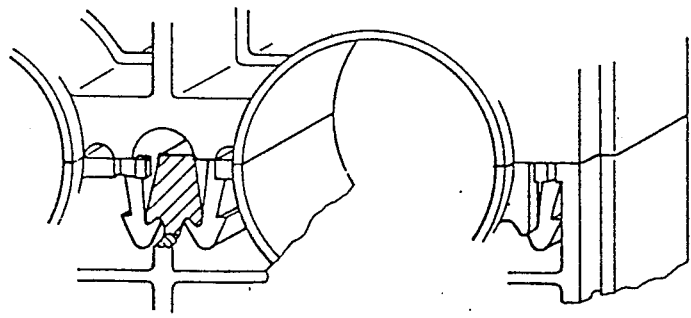
FIG. 3C shows the engaged conduit holder according to FIGS. 3A and 3B.

Furthermore, the female section 400 (406) is formed with a single opening 404 on front side or rear side, as shown in FIGS. 1B, 2B and 3B, or formed with two openings 404, 404A on both front and rear sides, as shown in FIGS. 1C and 2C, whereby in case of design change or wrong assembly working, the male section 100 can be conveniently integrally disassembled from the female section 400 (406) through the openings 404, 404A, permitting the cable conduit holder to remain as completely workable unit as original without any damage.

Moreover, a stopper is additionally disposed at the opening. The stopper can be a partially movable stopper member 405, as shown in FIGS. 1B, 2B, 1C, 2C, 4A and 4B, or a pair of protuberances 405A, as shown in FIGS. 5A and 5B. With respect to the double-side female section 400 shown in FIG. 1B, only one side thereof has two openings, and only one of these two openings is provided with the partially movable stopper member 405 or protuberances 405A. With respect to the double-side female section 400 shown in FIG. 1C, each of two sides thereof has two openings, i.e., four openings 404, 404A are disposed, and on each side, only one of the openings 404 is disposed with a partially movable stopper member 405 or protuberances 405A. The stopper member or protuberances are used to prevent the male section from undesirably slipping out of the female section due to external force accidentally applied thereon. Only when the male and female sections are intentionally evenly pulled or pushed in a horizontal lateral direction can the male section be disassembled from the female section through the lateral openings. Otherwise, the male section can hardly separate from the female section against the partially movable stopper member 405 or protuberances 405A.

Figure 4A:
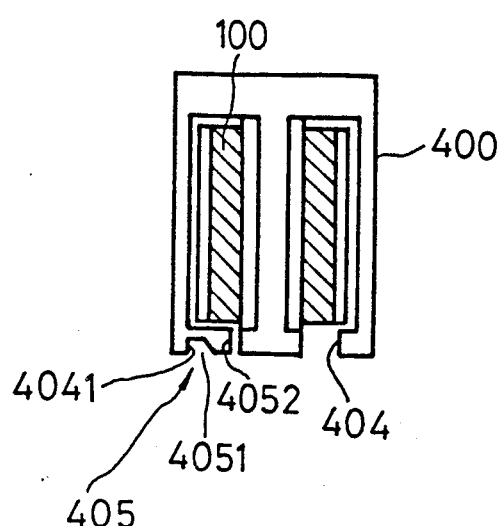
FIGS. 4A to 4C show a top view, a sectional view and an illustrative view of an embodiment of the stopper of this invention.
Figure 5A:
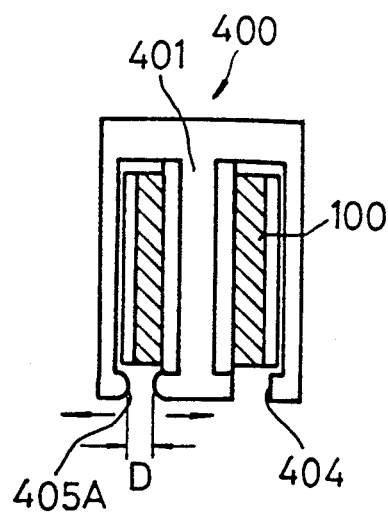
FIGS. 5A and 5B show a top view and a sectional view of another embodiment of the stopper of this invention.
Figure 4B:
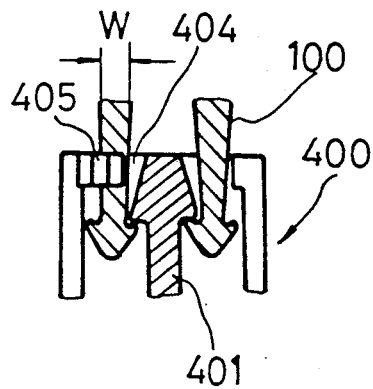
Figure 5B:
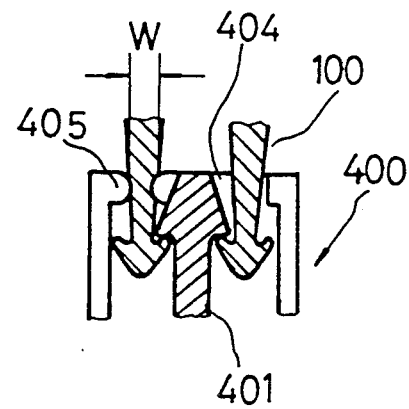
Figure 4C:
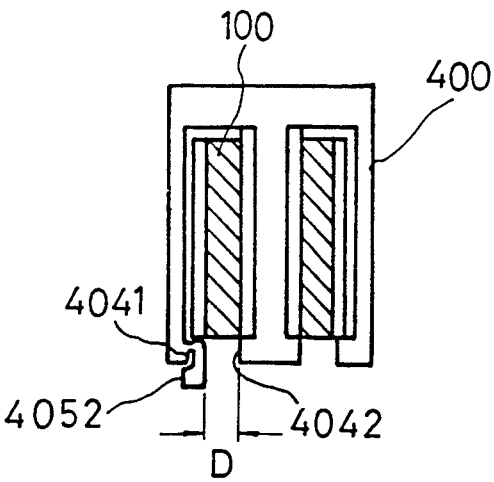
Figure 6A:
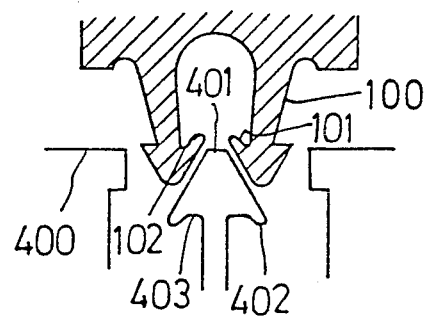
FIGS. 6A to 6C show illustrative views of the engaging movement of the male and female sections of this invention.
Figure 6B:
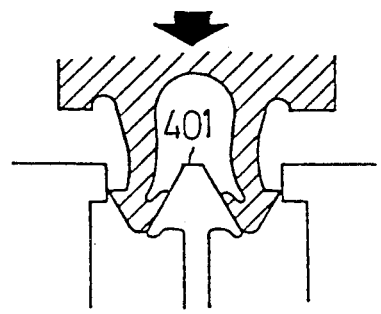
Figure 6C:
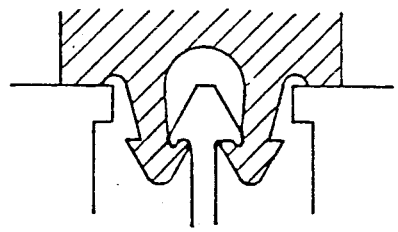
Figure 6D:
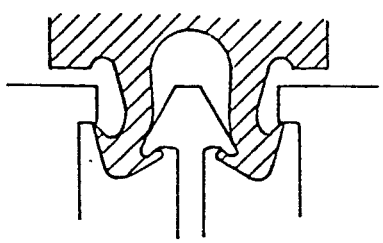
FIG. 6D shows an illustrative view of applying the upward force for disengaging movement of male and female according to FIGS. 6A to 6C.
Figure 7A:
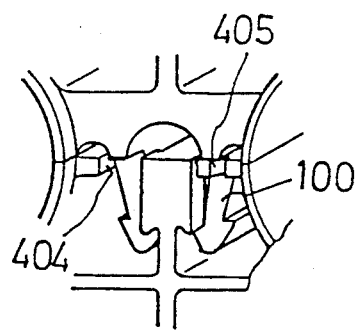
FIGS. 7A to 7D are the perspective views of the assembly of this invention showing the procedure of transversely disassembling movement of the male section from the female section.
Figure 7B:
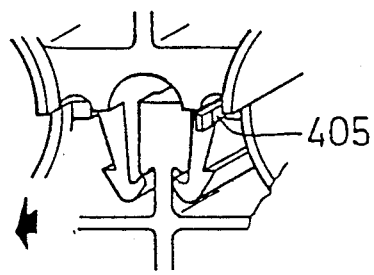
Figure 7C:
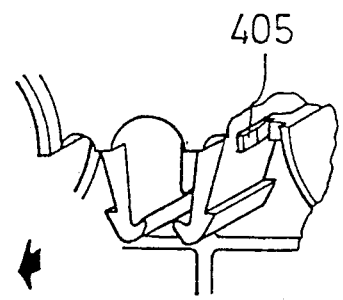
Figure 7D:
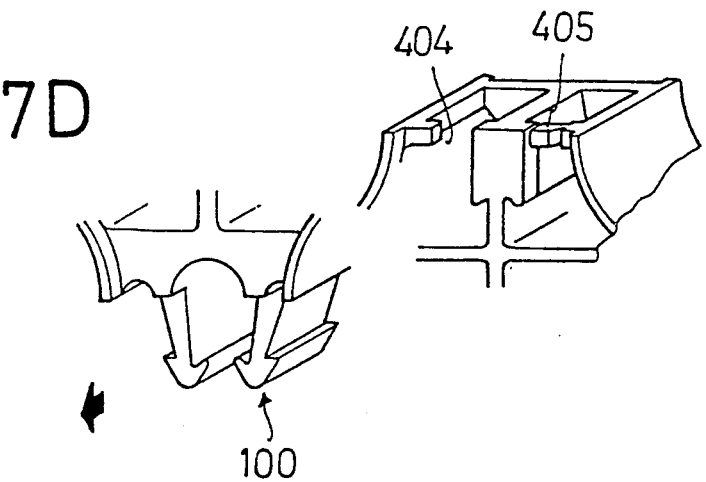

As shown in FIGS. 4A and 4B, the partially movable stopper member 405 has a relatively small thickness portion 4051 which connects with the side wall of the opening of the female section 400. The angle contained between the portion 4051 and lateral wall 4041 of the opening can be freely designed so as to permit a free end 4052 of the stopper member 405 to be pushed outward by the male section 100. The distance D between the inner surface of folded free end 4052 and the lateral wall 4042 of the opening is preferably smaller than the width W of the upper portion of the projection of the male section 100, as shown in FIG. 4C, to prevent unexpected slipping of the male section while permitting the male section 100 to be intentionally manually pulled out of the male section against the partially movable stopper member 405 through the opening 404.

As shown in FIGS. 5A and 5B, another embodiment of the stopper of this invention includes two protuberances 405A which are formed on the lateral walls of one of the openings 404 of one side. The distance D between two protuberances 405A is slightly smaller than the width W of upper portion of the projection of the male section 100 so as to prevent undesirable slipping out.

Please now refer to FIG. 6 which shows the engaging movement of the male and female sections. When engaged, the male section 100 is aimed at the female section 400 as shown in FIG. 6A. Then the male section 100 is pressed down with its projections inserted into the female section 400 so that the acute hook 101 and recess 102 are moved downward along the slant surfaces of the slant guide seat 401 of the female section, as shown in FIG. 6B. When reaching the lower edge of the slant guide seat 401, the hook 101 of male section 100 then engages the recess 403 of the female section 400 and the hook 402 of female section 400 engages the recess 102 of the male section 100 and thus the engaging movement is completed, as shown in FIG. 6C. Referring to FIG. 6D, when the male section is pulled upward, since the hooks of the male and female sections are engaged with recess portions thereof each other tightly, the male section can hardly separate from the female section.

Please now refer to FIG. 7 which shows the disassembling movement of the male and female sections. As shown in FIG. 7, when the male section 100 is pulled out horizontally, since one end of the partially movable stopper member 405 is fixed while the other end thereof is movably, the stopper member will be forced to stretch outward, as shown in FIG. 7B. When the male section is continously pulled outward, the stopper member is then stretched outward thoroughly, permitting the male section to wholly disassemble from the female section through the opening 404, as shown in FIG. 7D, without any damage.

Figure 8B:
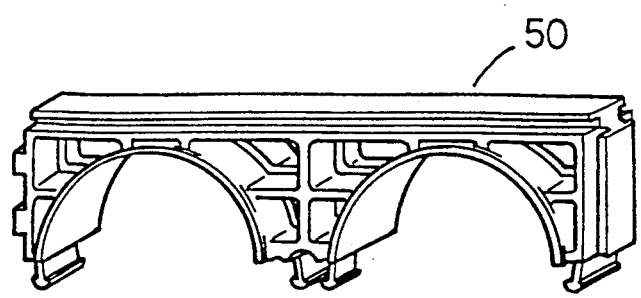
Figure 8C:
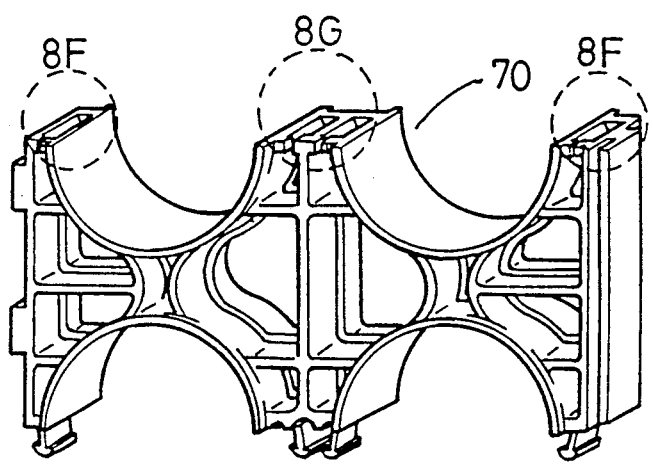
Figure 8D:
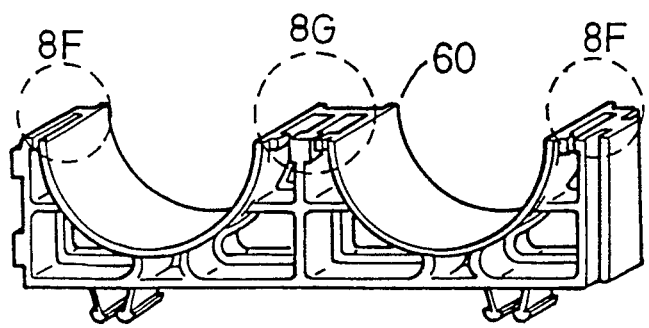
Figure 8E:
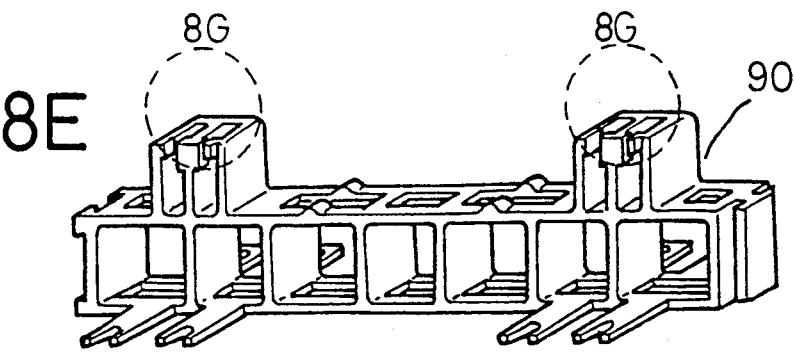

The male and female sections of this invention can serve as various underground conduit holder with different conduit numbers and orientation (up or down), as shown in FIGS. 8B, 8D, and convertible underground conduit holder, as shown in FIG. 8A, and conduit holder 70 with two orientations, as shown in FIG. 8C, and can.be applied to base support 90, as shown in FIG. 8E. Furthermore, the male and female sections can be alternately applied, i.e., both male and female structures can be disposed on same side (up or down) of the underground conduit holder to save the cost of manufacturing mold of the underground conduit holder.

I claim:

1. An improved insert type of disengageable underground conduit holder mainly comprising a male assembly and a female assembly which can be disengageably and tightly engaged with each other,
    said male assembly having at least one projection male section comprising two downwardly extending male projection bodies, each bottom of which has a downward arrow-shaped cross-sectional configuration having one an acute hook portion at the outer side and one an associated recess portion at the inner side;
    said female assembly comprising a frame body formed with two slant guide surface openings therein for receiving said two downward arrow-shaped configurations of said male assembly;
    a spacer block disposed between said two openings having an upward arrow-shaped cross-sectional configuration, the bottom of which has an acute hook portion at the outer side and an associated recess portion at the inner side corresponding to said recess portion and hook portion of said male assembly;
    whereby when associated, said hook portions of said male and female assembly are respectively engageable with said associated recess portions of said female and male assembly, one side of the frame body of said female assembly being formed with an open mouth to communicate with said two slant guide surfaces openings respectively, so that said male assembly is wholly disengageable from said female assembly without damage, a stopper means being disposed in a side portion of said open mouth to prevent undesirable slipping of said male assembly out of said female assembly.

2. An improved insert type of disengageable underground conduit holder mainly comprising a male assembly and a female assembly which can be disengageably and tightly engaged with each other, said male assembly comprising one downwardly extending male projection body, the bottom of which has a downward arrow-shaped cross-sectional configuration having an acute hook portion at the outer side and an associated recess portion at the inner side;

said female assembly comprising a frame body formed with a slant guide surface opening therein for receiving said downward arrow-shaped configuration of said male assembly, one side of said frame body having a half upward arrow-shaped cross-sectional configuration, the bottom of which has an acute hook portion at the outer side and an associated recess portion at the inner side corresponding to said recess portion and hook said portion of said male assembly, whereby when associated, said hook portions of said male and female assembly are respectively engageable with said associated recess portions of said female and male assembly, one side of the frame body of said female assembly being formed with an open mouth to communicate with said slant guide surface opening, so that said male assembly is wholly disengageable from said female assembly without damage, a stopper means being disposed in a side portion of said open mouth to prevent undesirable slipping of said male assembly out of said female assembly.

3. An underground conduit holder as claimed in claim 1 or 2, wherein said stopper means comprises a partially movable stopper member disposed in said open mouth formed on at least one side of said female frame body.

4. An underground conduit holder as claimed in claim 3, wherein said partially movable stopper member has a free end and a portion connecting with side wall of said open mouth.

5. An underground conduit holder as claimed in claim 4, wherein when said partially movable stopper member is biased by said projection of said male assembly, said free end of said stopper member is pushed and folded outward to go near to said portion connecting with said side wall of said open mouth, and the distance between inner surface of said folded free end and said side wall of said open mouth is slightly smaller than the thickness of an upper portion of said projection of said male assembly.

6. An underground conduit holder assembly as claimed in claim 1 or 2, wherein said stopper means comprises two protuberances disposed on two side walls of said open mouth of said female frame body, and the distance between said two protuberances being slightly smaller than the thickness of an upper portion of said projection of said male assembly.

7. An underground conduit holder as claimed in claim 6, wherein said protuberances are semicircularly shaped.

* * * * *